United States Patent
Okada

(10) Patent No.: US 6,752,306 B2
(45) Date of Patent: Jun. 22, 2004

(54) PINCH ROLLER APPARATUS

(75) Inventor: Toshihiro Okada, Kanagawa (JP)

(73) Assignees: Kabushiki Kaisha; Meiji Gomu Kasei, Tokyo (JP)

( * ) Notice: Subject to any disclaimer, the term of this patent is extended or adjusted under 35 U.S.C. 154(b) by 0 days.

(21) Appl. No.: 10/273,253

(22) Filed: Oct. 18, 2002

(65) Prior Publication Data

US 2003/0052150 A1 Mar. 20, 2003

Related U.S. Application Data

(62) Division of application No. 09/600,178, filed as application No. PCT/JP99/06724 on Dec. 1, 1999, now Pat. No. 6,467,669.

(30) Foreign Application Priority Data

Jul. 22, 1999 (JP) .............................. 11-207068
Oct. 12, 1999 (JP) .............................. 11-289604

(51) Int. Cl.⁷ .............................................. B65H 20/00
(52) U.S. Cl. ..................... 226/194; 226/180; 226/1; 384/192; 384/297; 384/909
(58) Field of Search ................. 226/180, 190, 226/194; 384/192, 297, 299, 300, 202, 908, 909

(56) References Cited

U.S. PATENT DOCUMENTS

| | | |
|---|---|---|
| 3,162,930 A | 12/1964 | Litsky |
| 3,724,919 A | 4/1973 | Lagally et al. |
| 3,907,234 A | 9/1975 | Sato et al. |
| 4,770,550 A * | 9/1988 | Takahashi ................... 226/194 |
| 5,452,833 A | 9/1995 | Hutter |
| 5,589,012 A | 12/1996 | Hobby et al. |
| 5,716,143 A | 2/1998 | Browne et al. |
| 5,896,240 A * | 4/1999 | Yamazaki et al. .......... 226/194 |
| 5,934,538 A | 8/1999 | Hirose et al. |
| 6,168,403 B1 | 1/2001 | Bush |

FOREIGN PATENT DOCUMENTS

| | | |
|---|---|---|
| JP | 7-65443 | 3/1995 |
| JP | 08-9447 | 3/1996 |
| JP | 10-49935 | 2/1998 |
| JP | 10-172202 | 6/1998 |
| JP | 10-228692 | 8/1998 |
| WO | WO98/26414 | 6/1998 |

OTHER PUBLICATIONS

J. Brandrup, E.H. Immergut, and E.A. Grulke, A. Abe, D.R. Bloch, Polymer Handbook, fourth edition, pp. 121 and 128, John Wiley & Sons, Inc., New York, Chichester, Weinheim, Brisbane, Singapore and Toronto.

* cited by examiner

*Primary Examiner*—Kathy Matecki
*Assistant Examiner*—Sang K Kim
(74) *Attorney, Agent, or Firm*—Rader, Fishman & Grauer PLLC

(57) ABSTRACT

A pinch roller apparatus which can stably move a tape in accordance with a sufficient self-aligning function is provided. A circular sliding plate brought into contact with both of an upper end surface and a lower end surface of a plain bearing is mounted to a pinch roller shaft so as to restrict an incline of the plain bearing. When setting a length of an axial gap between the circular sliding plate brought into contact with the upper end surface of the plain bearing and the plain bearing to A and a length of an outer diameter of the circular sliding plate to B, the structure is made such as to satisfy a relation $0.007 \leq A/B \leq 0.06$. Further, when setting a clearance in a diametrical direction between the pinch roller shaft and the sliding surface of the plain bearing to X and an effective length of the sliding surface of the plain bearing to Y, it is preferable to structure so as to satisfy the relation $X/Y \geq 0.052$.

15 Claims, 6 Drawing Sheets

PINCH ROLLER APPARATUS

RELATED APPLICATION

This Application is a divisional application of the application Ser. No. 09/600,178 filed on Aug. 4, 2000, now U.S. Pat. No. 6,467,669 issued on Oct. 22, 2002, which is the National Stage entry of PCT/JP99/06724, filed Dec. 1, 1999.

BACKGROUND OF THE INVENTION

1. Field of the Invention

The present invention relates to a pinch roller apparatus used for a tape driving apparatus in a video tape recorder, an audio tape recorder and the like.

2. Description of the Prior Art

The pinch roller apparatus used for the tape driving apparatus is structured such as to grip a tape between a pinch roller main body and a capstan and feed the tape in accordance with a driving operation of the capstan. In order to securely feed the tape moving between the pinch roller apparatus and the capstan in a stable state, the pinch roller apparatus is required a self-aligning function for following an incline of the capstan. Accordingly, a bearing having a self-aligning function is employed for the pinch roller apparatus.

In recent years, in place of an expensive ball bearing, for example, a resin plain bearing described in Japanese Patent Unexamined Publication No. 10-49935 and 10-228692 or an oilless plain bearing described in Japanese Utility Model Publication No. 8-9447 are used for the bearing of the pinch roller apparatus having the self-aligning function.

The pinch roller apparatus mentioned above is generally structured in the following manner. That is, the pinch roller apparatus is formed by providing a rubber-like elastic body on an outer periphery of a sleeve made of a metal such as an aluminum, a brass and the like or a resin so as to form a pinch roller main body and pressure fitting the plain bearing into the sleeve. Then, it is mounted by inserting a pinch roller shaft having one end mounted to an arm into the plain bearing. The pinch roller apparatus is structured such as to press the pinch roller main body to the capstan by moving the arm so as to grip the tape. The self-aligning function of the pinch roller corresponds to an operation of making a rotary shaft of the pinch roller main body in parallel to the capstan due to a clearance between the pinch roller shaft and the plain bearing.

As mentioned above, the self-aligning function in the conventional pinch roller apparatus is performed by the pinch roller main body being inclined in a direction of the capstan due to the clearance between the pinch roller shaft and the plain bearing. However, the pinch roller main body is also inclined in a direction perpendicular to the direction of the capstan in addition to the direction of the capstan, that is, a moving direction of the tape. Accordingly, in view of a moving stability of the tape, it is preferable that the clearance of the plain bearing corresponding to the incline of the pinch roller main body is set as small as possible.

Further, in the case that the plain bearing is a resin plain bearing, it has been hard to secure an accuracy of a size since a shrinkage is generated after being formed by a metal mold. Further, the plain bearing is, as mentioned above, assembled by being pressure fitted into the sleeve forming the pinch roller main body. However, an inner diameter of the sleeve itself is not always fixed and the plain bearing is shrunk in a radial direction at a time of being pressure fitted into the sleeve. Accordingly, it has been significantly hard to accurately form the inner diameter of the plain bearing at a time of assembling as the pinch roller due to an error of the inner diameter of the sleeve as well as an error in a size of the plain bearing itself.

Further, when the clearance between the pinch roller shaft and the plain bearing is too small, a smooth rotation of the pinch roller main body is restricted, and it is impossible to obtain a sufficient self-aligning function. On the contrary, when the clearance between the pinch roller shaft and the plain bearing is too large, as well as a durability of the plain bearing is deteriorated, there is a problem that it is impossible to stably move the tape due to a point contact between the capstan and the roller main body.

On the contrary, the pinch roller apparatus described in Japanese Patent Unexamined Publication No. 10-228692 is structured such as not to self-align in accordance with the clearance but to self-align in accordance with an elasticity of the plain bearing, in order to solve the problem generated in the case that the clearance between the pinch roller shaft and the plain bearing is large. Accordingly, as well as the plain bearing is made of a resin, Young's modulus of the resin is set to 10 kgf/mm$^2$ or more and 200 kgf/mm$^2$ or less. Further, in the case that one or a plurality of gap portions for facilitating a shape change are provided in the resin plain bearing, the Young's modulus of the resin may be set to 50 kgf/mm$^2$ or more and 1500 kgf/mm$^2$ or less.

Then, the pinch roller apparatus disclosed in the publication mentioned above is structured such that the rotary shaft of the roller main body and the rotary shaft of the capstan are made in parallel to each other due to an elasticity of the resin constituting the plain bearing and the inner peripheral surface of the plain bearing can slide in a state of being nearly in a surface contact with the inclined roller shaft. It is said that accordingly, since the roller shaft and the inner peripheral surface of the plain bearing are not in a point contact state even in a state that the self-aligning function is served, a part of the plain bearing is not abnormally abraded, so that it is possible to sufficiently secure a durability of the pinch roller even in the case of the resin plain bearing.

However, since the pinch roller apparatus described in Japanese Patent Unexamined Publication No. 10-228692 mentioned above is self-aligned in accordance with an elasticity of the resin constituting the plain bearing, there is a risk that the plain bearing generates a fatigue fracture after being used for a long time. Further, since the pinch roller apparatus mentioned above self-aligns in accordance with an elasticity of the resin not with the clearance, much time is required before the pinch roller main body becomes in parallel to the capstan, so that there is a problem that it is impossible to self-align for a short time.

Further, in the pinch roller apparatus described in Japanese Patent Unexamined Publication No. 10-228692 mentioned above, since the elastic operation is different between the gap portion and the non-gap portion in the case of providing a plurality of gap portions in the plain bearing, a bending amount of the plain bearing is different between a time when the inner peripheral surface of the gap portion of the plain bearing is brought into contact with the roller shaft and a time when the inner peripheral surface of the non-gap portion of the plain bearing is brought into contact with the roller shaft, so that there is a risk that a moving operation of the tape becomes uneven. Further, the pinch roller apparatus mentioned above is structured such as to set a contact area between the roller shaft and the plain bearing when pressing the roller main body to the capstan to be great. Accordingly, since an amount of a power consumption of a capstan motor becomes significantly increased, it is not preferably applied to the pinch roller apparatus for a camera integral-type compact video tape recorder and a compact audio tape recorder which are driven by a battery.

The present invention is made by taking the current circumstances into consideration, and an object of the present invention is to provide a pinch roller apparatus having the following objects.

One of the objects of the present invention is to provide a pinch roller apparatus which can stably move a tape in accordance with a sufficient self-aligning function.

Another object of the present invention is to provide an inexpensive pinch roller apparatus as a structure which can easily manufacture a plain bearing.

Further, the other object of the present invention is to provide a pinch roller apparatus in which an assembly of the pinch roller can be easily performed at a time of inserting a pinch roller shaft into a plain bearing pressure fitted to a sleeve so as to assemble the pinch roller.

Still further, the other object of the present invention is to provide a pinch roller apparatus which can secure a good tape movement by making a clearance small so as to reduce an incline in a moving direction of the tape.

Furthermore, the other object of the present invention is to provide a pinch roller apparatus which can reduce an amount of a power consumption of a capstan motor.

Moreover, the other object of the present invention is to provide a pinch roller apparatus in which a self-aligning function can be securely performed for a short time.

DISCLOSURE OF THE INVENTION

The present invention is structured as follows for achieving the objects mentioned above. That is, a pinch roller apparatus in accordance with the present invention is structured such as to mount a pinch roller main body provided with a rubber-like elastic body on an outer periphery of a sleeve via a plain bearing to a pinch roller shaft having one end fixed to an arm and press the pinch roller main body to a capstan by moving the arm. A circular sliding plate brought into contact with both of an upper end surface and a lower end surface of the plain bearing is mounted to the pinch roller shaft, and an end cap is adhered to a front end portion of the pinch roller shaft. When setting a length of an axial gap between the circular sliding plate brought into contact with the upper end surface of the plain bearing and the plain bearing to A and a length of an outer diameter of the circular sliding plate to B, the structure is made such as to satisfy a relation $0.007 \leq A/B \leq 0.06$. By setting the relation between A and B so that the plain bearing is inclined at the range mentioned above, it is possible to reduce a width for self-alignment. Accordingly, it is possible to restrict the incline in the moving direction of the tape to a small level and it is possible to secure an improved movement of the tape.

Further, when setting a clearance in a diametrical direction between the pinch roller shaft and the sliding surface of the plain bearing to X and an effective length of the sliding surface of the plain bearing to Y, it is preferable to structure so as to satisfy the relation $X/Y \geq 0.052$. By making the structure so that X and Y satisfy the relation mentioned above, the clearance between the pinch roller shaft and the sliding surface of the plain bearing has a sufficient magnitude. Accordingly, the plain bearing and the sleeve to which the plain bearing is pressure fitted may be structured so as to be over a designed error of size, so that it is easy to form the plain bearing and assemble the pinch roller apparatus. In accordance with the present invention, as is different from the conventional method of aligning in response to the clearance X in the diametrical direction between the pinch roller shaft and the plain bearing, for preference, the clearance X is formed greater than the conventional one and an amount of alignment is adjusted in accordance with a length of a gap in an axial direction at upper and lower ends of the plain bearing.

In one aspect of the present invention, both end surfaces of the plain bearing mentioned above are formed in a taper-like or circular arc-shaped inclined surface in a radial direction toward an outer peripheral surface from a center portion of the shaft. The circular sliding plate brought into contact with both of the upper end surface and the lower end surface of the plain bearing is inserted into the pinch roller shaft having one end fixed to the arm. In the case of forming both end surfaces of the plain bearing in the taper-like or circular arc-shaped inclined surface in the radial direction toward the outer peripheral surface from the center portion of the shaft, since both end surfaces of the plain bearing can be inclined in a state of sliding on the circular sliding plate, it is possible to restrict the length of the gap in an axial direction as small as possible, so that it is possible to move the tape in a stable state.

In one aspect, the plain bearing forms a sliding surface which is parallel to an axial direction of the plain bearing at a center portion of the inner peripheral surface, and forms a taper-like or circular arc-shaped non-sliding surface which is gradually expanded in a radial direction toward the end portion of the plain bearing from both end portions of the sliding surface. A length of the parallel sliding surface is not particularly limited, however, it is preferable to be set to 10 to 30% the length of the plain bearing. Further, the inner peripheral surface of the plain bearing may be formed in a parallel sliding surface substantially at a whole-portion except a beveling portion in both end portions.

Further, in the embodiment mentioned above, the plain bearing is formed in a solid cylindrical shape, however, in another embodiment, it may be structured such that the plain bearing is constituted by an inner cylinder and an outer cylinder and a hollow gap open to at least one end surface is provided between the inner cylinder and the outer cylinder. The hollow gap extends in an axial direction. The structure may be made such that the hollow gap is open to only one end surface of the plain bearing and another end surface is closed, or may be made such that the hollow gap is open to both end surfaces and the inner cylinder and the outer cylinder are connected at a center portion. Further, it is a matter of course that the aspects mentioned above can be independently structured, and the aspects may be combined. For example, it is possible to combine the shape of both end surfaces of the plain bearing and the shape of the inner peripheral surface. Further, it is possible to combine the structure of the hollow gap of the plain bearing and the shape of the inner peripheral surface. Still further, it is possible to combine the shape of both end surfaces of the plain bearing and the structure of the hollow gap. Otherwise, it is possible to combine all the structures to form the plain bearing.

The plain bearing mentioned above is made of a self-lubricating resin. As the self-lubricating resin, it is possible to employ, for example, one or two or more of a fluorine resin, a polyester resin, a polyether sulfone resin, a polyolefine resin, a polyacetal resin, a polyamide resin and a polyphenylene sulfide resin.

Further, the pinch roller apparatus in accordance with the invention can be structured such that the plain bearing is made of a self-lubricating resin having a Young's modulus 1600 kgf/mm² or more. By employing the resin having the Young's modulus 1600 kgf/mm² or more, an abrasion of the plain bearing is significantly small even when the plain bearing and the roller shaft slide in a state of being in a point contact. Further, since the contact area between the plain bearing and the roller shaft is small, it is possible to restrict an amount of a power consumption of the capstan motor to a low level, so that it is preferably applied to a camera integral-type compact video tape recorder and a compact audio tape recorder which are driven by a battery.

Further, a self-aligning function of the plain bearing made of the self-lubricating resin having the Young's modulus 1600 kgf/mm² or more is not achieved by an elasticity of the resin but achieved by the clearance with respect to the roller shaft. Accordingly, the pinch roller main body can immediately follow the incline of the capstan, a time before the pinch roller main body becomes in parallel to the capstan, that is, a self-aligning time requires a short time, so that it is possible to move the tape in a good condition. Further, by employing the resin having the Young's modulus 1600 kgf/mm² or more, the inclined surface of the plain bearing is not deformed even when being brought into contact with the circular sliding plate as well as there is no risk of generating a fatigue fracture even after being used for a long time, so that the incline of the plain bearing can be securely restricted, and the self-aligning function can be smoothly achieved.

In the plain bearing employing the resin having the high Young's modulus, it is also possible to form the inner peripheral surface in a linear parallel surface from one end surface to another end surface, however, a shape of the plain bearing is not particularly limited. Accordingly, in the plain bearing employing the resin having the Young's modulus 1600 kgf/mm² or more, the structure may be made such that a linear parallel surface is provided at a center portion so as to form a taper-like or circular arc-shaped expanded surface which gradually expands in a radial direction from both end portions of the parallel surface toward the end surface of the plain bearing. Further, in the case of forming both end surfaces of the plain bearing in the taper-like or circular arc-shaped inclined surface in the radial direction from the center portion of the shaft toward the outer peripheral surface, and in the case of being constituted by the inner cylinder and the outer cylinder and being provided with the hollow gap open to at least one end surface between the inner cylinder and the outer cylinder, it is preferable to insert the circular sliding plate which is brought into contact with both of the upper end surface and the lower end surface of the plain bearing.

Further, also in the case that a plurality of hollow gaps are provided in the plain bearing, since the elastic operation is not different between the hollow gap portion and the non-gap portion due to the construction of the resin having the high Young's modulus, a substantially fixed being amount can be obtained and it is possible to secure a uniform tape movement.

As the resin having the Young's modulus 1600 kgf/mm² or more, it is possible to employ a polyamide resin, a polyphenylene sulfide resin, a polyether nitrile resin, a polyimide resin and the like.

BEST MODE FOR CARRYING OUT THE INVENTION

A pinch roller apparatus in accordance with the present invention will be in detail described below on the basis of the following particular embodiments.

At first, a description will be given of a plain bearing for a pinch roller in accordance with the present invention. A plain bearing 1 is wholly formed in a solid cylindrical shape. A diameter of an inner peripheral surface is set to be larger at both end portions than at a center portion. That is, a sliding surface 3 being in parallel to an axial direction of the plain bearing 1 is formed at the center portion of the inner peripheral surface, and a length of the sliding surface 3 is preferably set to 10 to 30% a length of the plain bearing 1. There is formed a taper-like or circular arc-shaped non-sliding surface 5 which is gradually expanded from both end portions of the sliding surface 3 toward an end surface of the plain bearing 1 in a radial direction.

As mentioned above, since the structure is made such that the inner peripheral surface of the plain bearing 1 does not wholly slide and the length of the sliding surface 3 brought into contact with the pinch roller shaft is set to 10 to 30% the length in the axial direction of the plain bearing 1, it is possible to greatly incline the plain bearing 1. That is, by forming the inner peripheral shape of the plain bearing in the manner mentioned above, it is possible to greatly incline as the length of the sliding surface is shorter in the case that the clearance in a diametrical direction between the pinch roller shaft and the sliding surface of the plain bearing is the same, and on the contrary, in the case that an amount of incline is the same, it is possible to make the clearance small. Accordingly, in one embodiment in accordance with the present invention, the structure is made such that the sliding surface of the plain bearing is not formed as a whole of the length of the plain bearing, but is limited to the center portion of the inner peripheral surface. In this case, when the length of the sliding surface 3 is smaller than 10% the length of the plain bearing 1, a surface pressure becomes high and a service life of the plain bearing and the pinch roller shaft becomes short. Further, when the length of the sliding surface 3 is greater than 30% the length of the plain bearing 1, it is impossible to greatly incline.

The plain bearing 1 is made of a self-lubricating resin. As the self-lubricating resin, it is possible to employ, for example, one or two or more of a fluorine resin, a polyester resin, a polyether sulfone resin, a polyolefine resin, a polyacetal resin, a polyamide resin and a polyphenylene sulfide resin.

Figure 2:
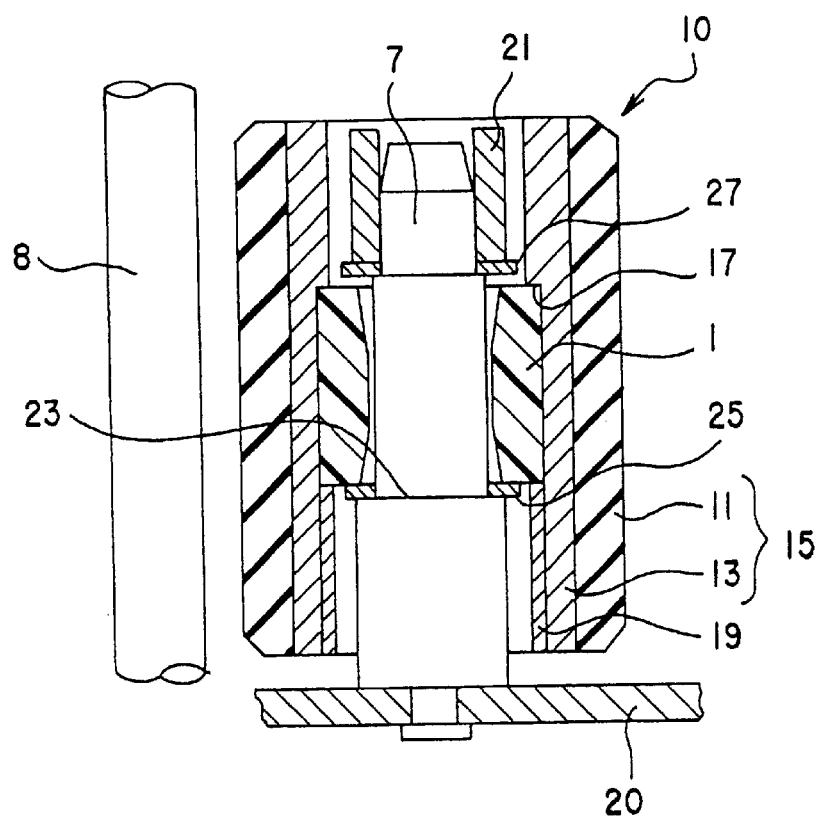
FIG. 2 is a vertical cross sectional view which shows a first embodiment of a pinch roller apparatus in accordance with the present invention.

Next, a description will be given of a pinch roller apparatus 10 in which the plain bearing 1 structured in the manner mentioned above is assembled. The pinch roller apparatus 10 is structured such that as shown in FIG. 2, a rubber-like elastic body 11 having a previously abraded outer peripheral surface is mounted to an outer peripheral surface of a metal sleeve 13 so as to form a pinch roller main body 15. An end surface of the plain bearing 1 is engaged by pressure fitting the plain bearing 1 so as to be engaged with a step portion 17 formed on an inner peripheral surface of the sleeve 13 and further pressure fitting a stopper 19 for preventing a coming-out. A stepped pinch roller shaft 7 fixed to an arm 20 at one end is inserted into the plain bearing 1 and an end cap 21 is fixed to a front end portion of the pinch roller shaft 7.

A circular sliding plate 25 brought into contact with a lower end surface of the plain bearing 1 is mounted to a stepped portion 23 of the pinch roller shaft 7, and a circular sliding plate 27 brought into contact with an upper end surface of the plain bearing 1 is mounted to an upper portion of the plain bearing 1. The end cap 21 and the circular sliding plate 27 are brought into contact with each other, and a predetermined gap is formed in an axial direction between the circular sliding plate 27 and the plain bearing 1. The circular sliding plates 25 and 27 are made of a synthetic resin or a metal such as a stainless steel and the like, and in particular are preferably made of a self-lubricating resin containing an additive such as a molybdenum and the like. In this case, a method of fixing the plain bearing 1 to an inner portion of the sleeve 13 is not limited to the embodiment mentioned above. For example, both end surfaces of the plain bearing 1 may be engaged by the stopper 19 for preventing a coming-out without forming the step portion 17 in the inner portion of the sleeve 13, or the plain bearing 1 may be simply pressed within the sleeve 13.

Figure 3:
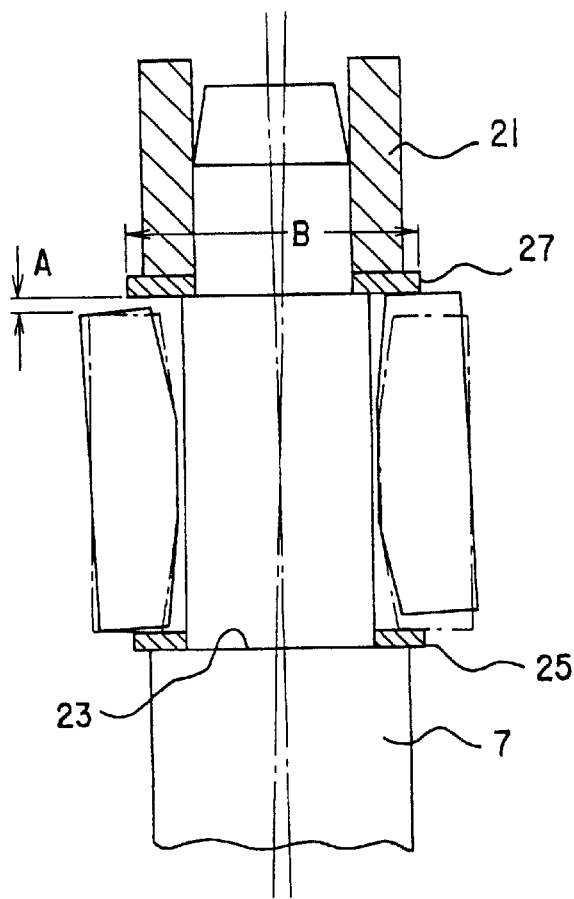
FIG. 3 is a cross sectional view of a main portion which shows a length of a gap in an axial direction of the plain bearing.

In the structure mentioned above, as shown in FIG. 3, when setting a length of a gap in an axial direction between the plain bearing 1 and the circular sliding plate 27 which is mounted so as to be brought into contact with the upper end surface of the plain bearing 1 to A, and a length of an outer diameter of the circular sliding plate 27 to B, it is possible to adjust an amount of self-alignment in accordance with A/B. A/B for adjusting the amount of self-alignment is greater than 0.007 and smaller than 0.06. In the case that the amount of self-alignment A/B is smaller than 0.007, a rotary shaft of the pinch roller main body 15 can be inclined only at a slight amount, so that the rotary shaft of the pinch roller main body 15 is not in parallel to the capstan 8 even when the pinch roller main body 15 is pressed to the capstan 8, and it is impossible to obtain a sufficient self-aligning function. On the contrary, in the case that the amount of self-alignment A/B is greater than 0.06, it is possible to set the amount of self-alignment to be great, however, the pinch roller main body 15 is greatly inclined in a direction perpendicular to the direction of the capstan, that is, a moving direction of the tape, so that it is impossible to secure a stable movement of the tape.

The circular sliding plates 25 and 27 restrict the incline of the plain bearing 1. Accordingly, it is necessary to form so that the length of the gap in the axial direction with respect to the plain bearing 1 satisfies the relation $0.007 \leq A/B \leq 0.06$ as mentioned above and the incline of the sleeve 13 is not prevented. That is, an outer diameter of the circular sliding plates 25 and 27 is set to be greater than a maximum inner diameter of the plain bearing and smaller than the inner diameter of the sleeve 13 or the stopper 19 so as to be brought into contact with the end surface of the plain bearing, whereby the sleeve 13 can be inclined at a predetermined amount.

Since the conventional pinch roller apparatus performs a self-alignment in accordance with the clearance between the pinch roller shaft and the inner diameter of the plain bearing, an amount of self-alignment is fixed and can not be changed at a time of assembling in the pinch roller apparatus. In the case of changing the amount of self-alignment, it is necessary to change the inner diameter of the plain bearing or change the outer size of the pinch roller shaft. However, in accordance with the present invention, since the structure is made such that the amount of self-alignment is adjusted in accordance with the gap between the end surface of the plain bearing and the circular sliding plate, it is possible to change the amount of self-alignment only by changing the gap between the end surface of the plain bearing and the circular sliding plate at a time of assembling in the pinch roller apparatus.

Figure 1:
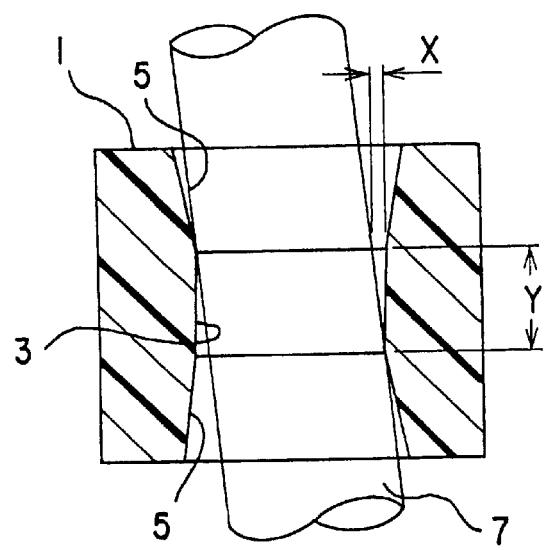
FIG. 1 is a cross sectional view which shows a relation between a plain bearing and a pinch roller shaft.

Further, as shown in FIG. 1, when setting the clearance between the pinch roller shaft 7 and the sliding surface 3 of the plain bearing 1 to X, and an effective length of the sliding surface 3 of the plain bearing to Y, it is formed so as to satisfy a relation $X/Y \geq 0.052$. When setting X/Y to be smaller than 0.052, it is hard to restrict the inner diameter of the plain bearing pressure fitted to a predetermined range due to an error of a size of the plain bearing itself caused by a shrinkage at a forming time and an error of the inner diameter of the sleeve, so that it is impossible to obtain a sufficient self-aligning function.

In the present invention, the amount of self-alignment is not determined on the basis of the clearance X in the diametrical direction between the pinch roller shaft 7 and the plain bearing 1, but the clearance X is rather set to be greater than the conventional one and the amount of self-alignment is determined on the basis of the length of the gap in the axial direction at the upper and lower ends of the plain bearing 1.

Figure 4:
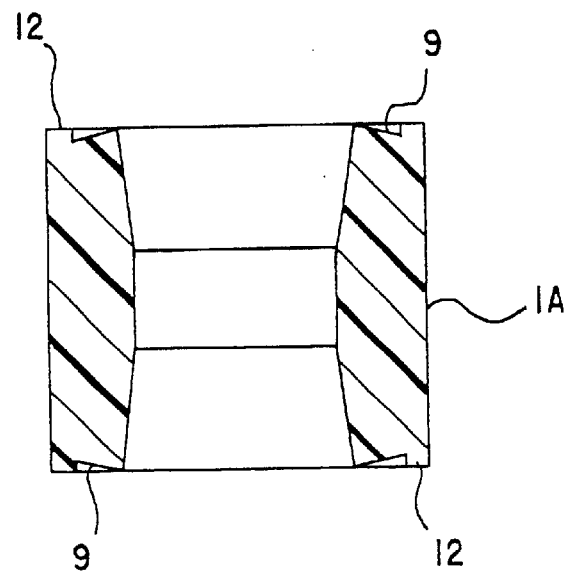
FIG. 4 is a cross sectional view which shows a second embodiment of the plain bearing.
Figure 5:
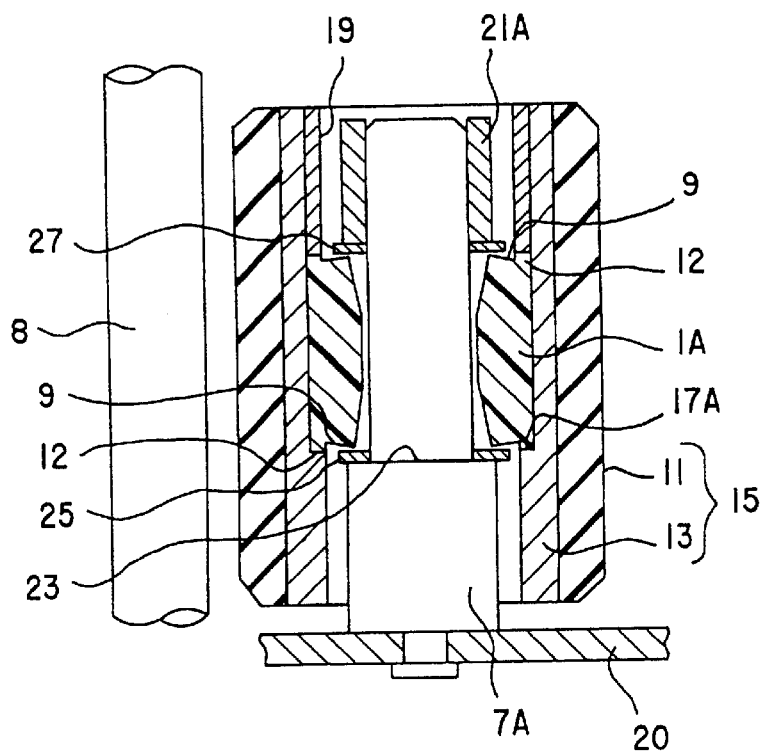
FIG. 5 is a vertical cross sectional view which shows a second embodiment of a pinch roller apparatus in accordance with the present invention.
Figure 6:
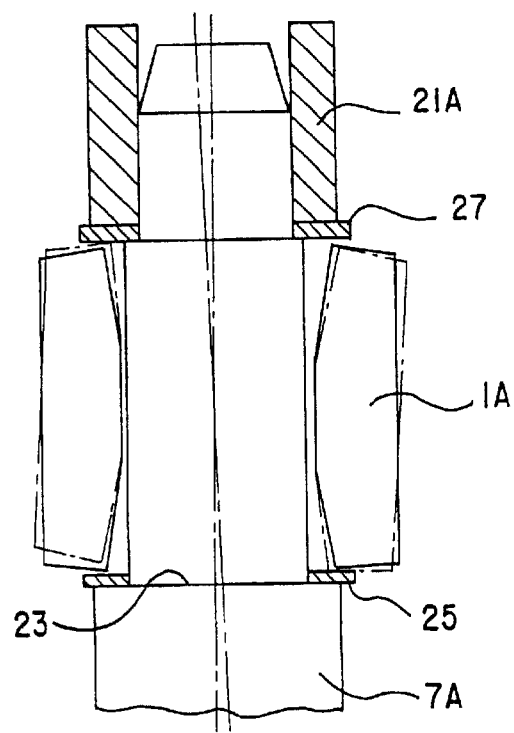
FIG. 6 is a cross sectional view of a main portion which shows a length of a gap in an axial direction of the plain bearing in accordance with the second embodiment.
Figure 12:
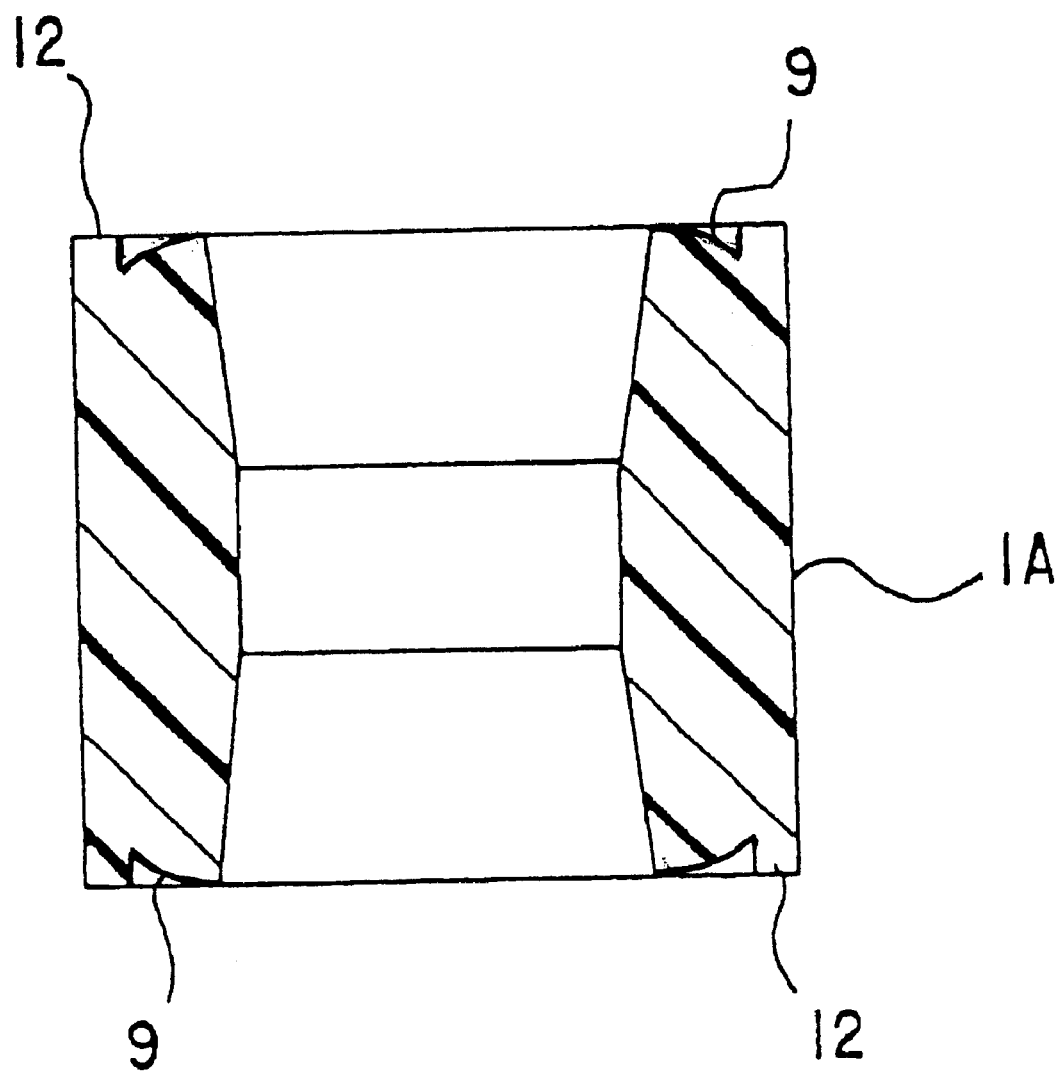
FIG. 12 is cross sectional view of the plain bearing with a circular arc-shaped inclined surface.

FIGS. 4 to 6 show a second embodiment of a pinch roller apparatus and a plain bearing in accordance with the present invention, in which shaped of both end surfaces of the plain bearing are different from the first embodiment. A plain bearing 1A is structured as shown in FIGS. 4 and 12, such that both end surfaces of the plain bearing are formed in a taper-like (FIG. 4) or circular arc-shaped inclined surface (FIG. 12) 9 in a radial direction from the center portion of the shaft toward the outer peripheral surface. In the present invention, the structure is made such as to adjust an angle of incline of the plain bearing in accordance with the length of the gap at the end surface in the axial direction of the plain bearing. Accordingly, both end surfaces of the plain bearing 1A is formed so as to be brought into contact with the circular sliding plates 25 and 27 in response to an incline of the plain bearing, both ends of the plain bearing 1A are formed in the taper-like or circular arc-shaped inclined surface 9 in a radial direction from the center portion of the shaft toward the outer peripheral surface, and flanges 12 are formed in the outer peripheral edge portion.

One of the flanges 12 is struck against a step portion 17A of the sleeve 13 when pressure fitting the plain bearing 1A into the sleeve 13, and another flange 12 is engaged by the stopper 19 pressure fitted to the sleeve 13 (refer to FIG. 5). Accordingly, a height of the flange 12 is not necessarily the same as that of the center portion of the end surface of the plain bearing 1A, but may be protrude from the center portion of the end surface or may be inversely low. In this case, it is possible to omit a formation of the flange 12. It is possible to omit the flange 12, form the inclined surface 9 so as to reach the outer peripheral surface of the plain bearing 1A and set a whole of the end surface of the plain bearing 1A to the inclined surface 9 (refer to FIG. 6) In the case of setting the whole of the end surface of the plain bearing 1A to the inclined surface 9, it is preferable to set the contact surface between the step portion 17A of the sleeve 13 and the stopper 19 to an inclined surface coinciding with the inclined surface 9.

The plain bearing 1A mentioned above can be assembled as the pinch roller apparatus in place of the plain bearing 1, in the same manner as the structure shown in FIG. 2. Further, as shown in FIG. 5, it is possible to insert the pinch roller main body 15 in a state of being vertically inverted at a time of inserting the pinch roller shaft 7A to the pinch roller main body 15 formed by mounting the rubber-like elastic body 11 to the outer peripheral surface of the metal sleeve 13. At this time, it is possible to mount the circular sliding plate 25 to the step portion 23 of the pinch roller shaft 7A and mount the circular sliding plate 27 to the lower end surface of the end cap 21A. In this case, in the embodiment shown in FIGS. 2 and 5, a description was given of the case that the circular sliding plate 27 and the end caps 21 and 21A are independently formed, however, the circular sliding plate 27 and the end caps 21 and 21A may be integrally formed.

In the case of integrally forming the circular sliding plate and the end cap, it is possible to reduce a labor and step for assembling as well as reducing a number of the parts. As the present embodiment, in the case of setting both end surfaces of the plain bearing 1A to the inclined surface 9, since the plain bearing 1A can be inclined in a state that the inclined surface 9 is almost brought into contact with the circular sliding plates 25 and 27, a length of the gap in the axial direction between the circular sliding plate 27 and the plain bearing 1A can be short. Accordingly, the length of the gap in the axial direction of the plain bearing 1A can be restricted to a necessarily minimum limit, and is significantly advantageous for stably moving the tape.

Figure 7:
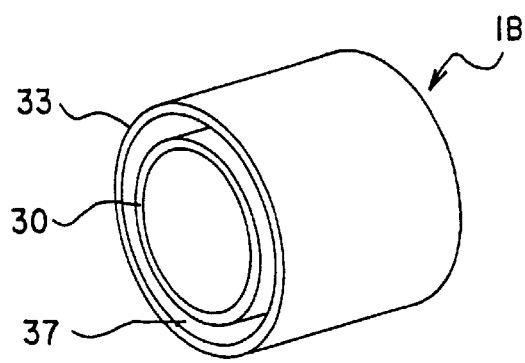
FIG. 7 is a perspective view which shows a third embodiment of a plain bearing.
Figure 8:
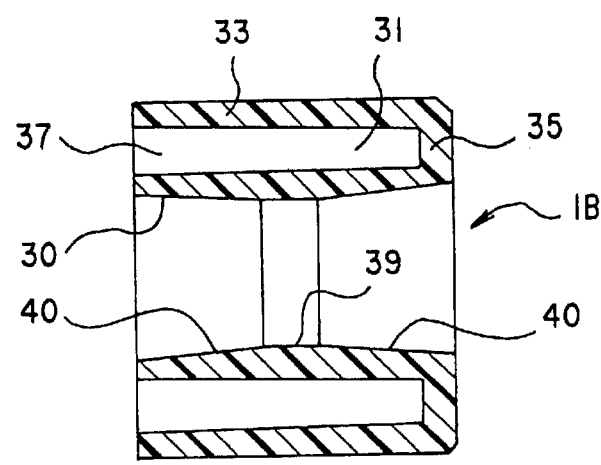
FIG. 8 is a vertical cross sectional view of the plain bearing in FIG. 7.

FIGS. 7 and 8 show a third embodiment of a resin plain bearing. In this embodiment, the structure is made such that a hollow gap open to at least one end surface is provided between the inner cylinder and the outer cylinder. The hollow gap extends in an axial direction. The plain bearing 1B is structured such that an outer cylinder 33 is arranged in an outer side of an inner cylinder 30 via a hollow gap 31, and the inner cylinder 30 and the outer cylinder 33 are connected by a connecting rib 35 in a radial direction provided on one end surface. Accordingly, the plain bearing 1B is structured such that one end surface is closed by the connecting rib 35 and an opening 37 is formed on another end surface. The hollow gap 31 is formed so as to gradually expand toward a side of the opening 37 for making it easy to be removed from the mold at a time of molding. Further, a shape of the inner surface of the inner cylinder 30 is structured such that a sliding surface 39 is formed at a center portion and a taper-like or circular arc-shaped non-sliding surface 40 is formed so as to gradually expand in a radial direction from both end portions of the sliding surface 39 toward an end portion of the inner cylinder 30, as in the same manner as that of the first and second embodiments of the plain bearing.

The hollow gap 31 is provided between the inner cylinder 30 and the outer cylinder 33, whereby the inner cylinder 30 has an elasticity at a time of molding. Accordingly, even when an insert of the metal mold is forcibly taken out on the inner peripheral surface of the inner cylinder 30 at a time of molding the plain bearing 1B, no crack and no breaking are generated. Further, since the plain bearing 1B becomes thin as a whole, a shrinkage and deformation after molding is reduced and it is possible to secure a high roundness.

Figure 9:
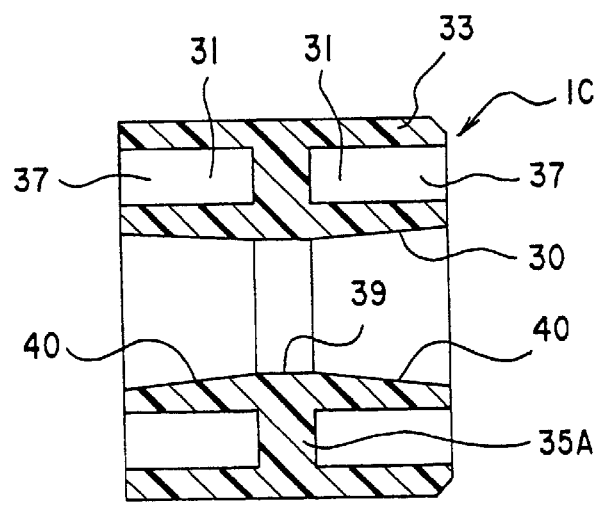
FIG. 9 is a vertical cross sectional view which shows the other embodiment of the plain bearing in FIG. 7.

FIG. 9 shows the other embodiment in FIG. 7 of the plain bearing provided with a hollow gap in an axial direction. In this embodiment, the structure is made such that a gap open to both end surfaces is provided between the inner cylinder and the outer cylinder. A plain bearing 1C is structured such that the inner cylinder 30 and the outer cylinder 33 are connected at a center portion in an axial direction by a connecting rib 35A in a radial direction and an opening 37 of the gap 31 is provided on both end surfaces. As mentioned above, in the case that the connecting rib 35A is provided at the center portion, it is possible to unify the elasticity at both end portions. In this case, since the other structures and the operations and effects are the same as those of the plain bearing 1B, the same reference numerals are attached to the same elements and a description thereof will be omitted.

Further, the structure of the plain bearing provided with the hollow gap open to the end surface is not limited to the embodiment mentioned above. An illustration is omitted, however, for example, the inner cylinder 30 and the outer cylinder 33 may be connected by a plurality of connecting ribs in an axial direction so as to uniformly separate the hollow gap in a circumferential direction. Further, the connecting rib in the radial direction and the connecting rib in the axial direction may be combined as the plain bearing 1B and the plain bearing 1C. Further, also in the plain bearing provided with the hollow gap open to the side surface, in the same manner as the second embodiment of the pinch roller apparatus in accordance with the present invention, both end surfaces of the plain bearings 1B and 1C may be formed in the taper-like or circular inclined surface 9 in a radial direction from the center portion of the shaft toward the outer peripheral surface. Further, the plain bearings 1B and 1C are also assembled and used as the pinch roller apparatus. With respect to the structure for assembling as the pinch roller, it is possible to apply the description in FIGS. 2 and 5. Accordingly, a detailed description will be omitted for avoiding a repeated description.

Figure 10:
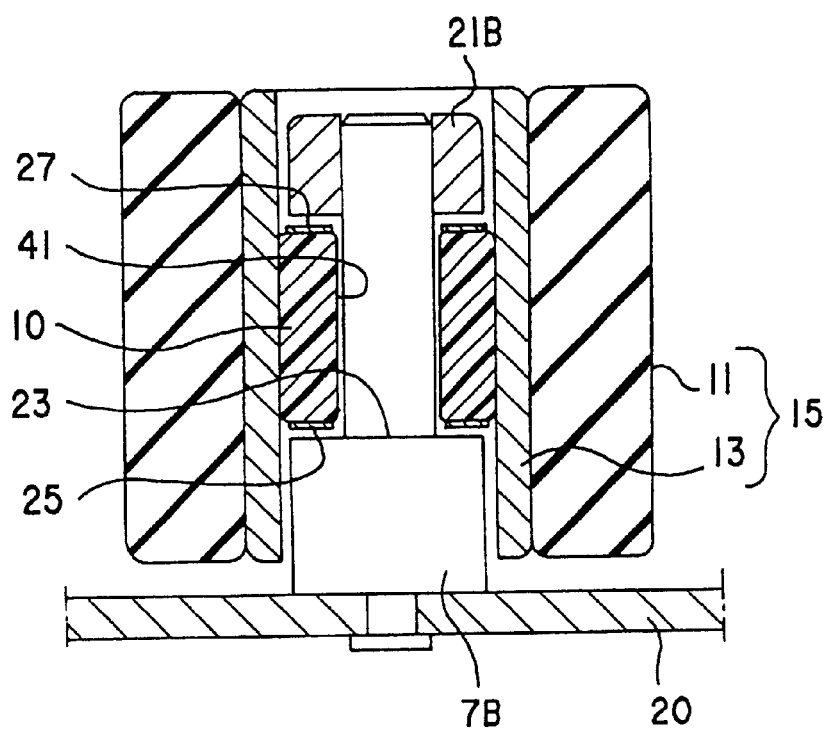
FIG. 10 is a vertical cross sectional view which shows the other embodiment of a pinch roller apparatus in accordance with the present invention.

Next, a description will be given of a third embodiment of a pinch roller apparatus in accordance with the present invention with reference to FIG. 10. In this embodiment, a substantially whole of the inner peripheral surface of the plain bearing is formed in a parallel sliding surface. That is, in the first and second embodiments of the pinch roller apparatus in accordance with the present invention, the plain bearing is structured such that the sliding surface which is in parallel to the axial direction of the plain bearing is formed at the center portion of the inner peripheral surface and the taper-like or circular arc-shaped non-sliding surface is formed so as to gradually expand in the radial direction from both end portions of the sliding surface toward the end portion of the plain bearing. On the contrary, a plain bearing 1D shown in the third embodiment is formed in a solid cylindrical shape by forming an inner peripheral surface in a sliding surface 41 being in parallel in the axial direction and both end surfaces in parallel surfaces. The pinch roller main body 15 is structured such as to mount the rubber roller 11 having an outer peripheral surface made of a predetermined abraded rubber to the outer peripheral surface of the metal sleeve 13, arrange the plain bearing 1D at a suitable position on the inner peripheral surface of the sleeve 13, insert the stepped pinch roller shaft 7B fixed to the frame 20 into the plain bearing 1D, and be fixed by an end cap 21B.

Young's modulus of the resin constituting the plain bearing 1D is 1600 kgf/mm² or more. By employing the resin having the Young's modulus 1600 kgf/mm² or more, an abrasion of the plain bearing 1D is significantly small even when the plain bearing 1D and the roller shaft 7B slide in a state of being in a point contact. Further, there is no risk that a fatigue fracture is generated even after being used for a long time. A self-adjusting function of the plain bearing 1D can be achieved by the clearance with respect to the roller shaft. Accordingly, the pinch roller main body can immediately follow the incline of the capstan, and a time before being in parallel to the capstan, that is, a self-aligning time required a short time, so that it is possible to move the tape in a good condition.

The circular sliding plates 25 and 27 for restricting the incline of the plain bearing 1D are mounted to upper and lower portions of the pinch roller shaft 7B, and the circular sliding plates 25 and 27 are made of a synthetic resin or a metal such as a stainless steel and the like. The circular sliding plates 25 and 27 are respectively fixed to the plain bearing 1D, and gaps are formed between the circular sliding plate 25 and the step portion 23 and between the circular sliding plate 27 and the end cap 21B. In this case, the gap in an axial direction in the upper and lower portions of the plain bearing 1D may be provided between the circular sliding plates 25 and 27 and the plain bearing 1D without fixing the circular sliding plates 25 and 27 to the plain bearing 1D. Further, it is possible to employ the methods described in connection to the first and second embodiments mentioned above for a method of fixing the plain bearing 1D to the inner portion of the sleeve 13.

The resin for constituting the plain bearing 1D is not particularly limited to as far as it satisfies the Young's modulus. For example, it is possible to employ a polyamide resin, a polyphenylene sulfide resin, a polyether nitrile resin, a polyimide resin and the like. Further, the resin for constituting the plain bearing may be structured such as add a reinforcement such as a carbon fiber, a glass fiber, a potassium titanate whisker and the like and a lubricant such as a molybdenum and the like as far as it satisfies the Young's modulus.

Figure 11:
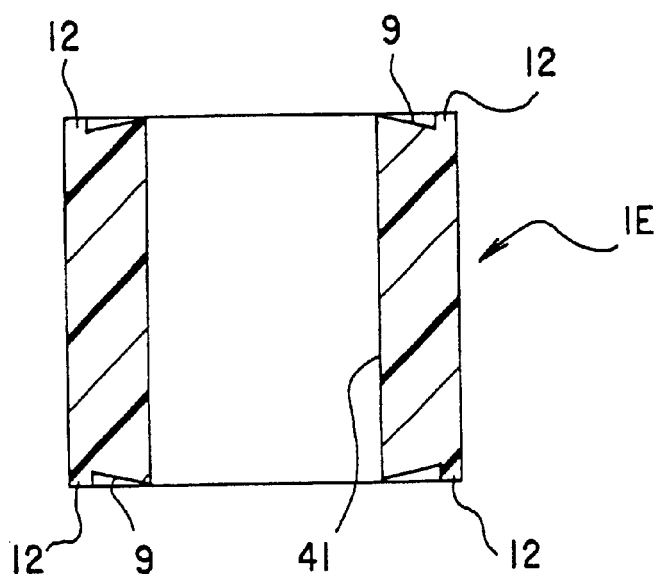
FIG. 11 is a cross sectional view which shows a fourth embodiment of the plain bearing.

FIG. 11 shows the other embodiment of a plain bearing in the case of employing a resin having a Young's modulus 1600 kgf/mm² or more. In this embodiment, the inner peripheral surface is formed in the sliding surface 41 being in parallel in an axial direction and both end surfaces are formed so as to be brought into contact with the circular sliding plates 25 and 27 in response to the incline of the plain bearing in the same manner as that of the embodiment shown in FIG. 4. That is, as is apparent from the drawing, both end surfaces of a plain bearing 1E is formed in a taper-like or circular arc-shaped inclined surface 9 in a radial direction from the center portion of the shaft toward the outer peripheral surface and a flange 12 is formed in the outer peripheral edge portion.

Accordingly, since the structure is the same as that of the plain bearing 1A shown in FIG. 4 except the shape of the inner peripheral surface, the description about the plain bearing 1A can be applied to a method of pressure fitting and mounting the plain bearing 1E into the sleeve 13 and a structure that the flange 12 can be omitted. Further, since the structure of assembling the plain bearing 1E as the pinch roller is the same as that of the plain bearings 1, 1A, 1B, 1C and 1D, it is possible to apply the description in FIGS. 2, 5 and 10. Accordingly, a detailed description will be omitted in order to avoid a repeated description.

Further, also in the plain bearing employing the resin having the Young's modulus 1600 kgf/mm² or more, it is possible to apply the shape of the plain bearing described with respect to FIGS. 7 to 9. That is, the plain bearings 1D and 1E may be constituted by the inner cylinder and the outer cylinder and may be formed in a shape in which a gap open to at least one end surface is provided between the inner cylinder and the outer cylinder. Also in the case that the hollow gap is provided between the inner cylinder and the outer cylinder, since the plain bearings 1D and 1E are made of the resin having the Young's modulus 1600 kgf/mm² or more, they are not different in an elastic function between the hollow gap portion and the non-gap portion, so that a bending amount of the plain bearing becomes substantially fixed between a time when the inner peripheral surface of the hollow gap portion in the plain bearing is brought into contact with the roller shaft and a time when the inner peripheral surface of the non-gap portion in the plain bearing is brought into contact with the roller shaft. Accordingly, it is possible to secure a stable movement of the tape without increasing a wow and flutter due to a zigzag movement of the tape or a vertical movement thereof.

Further, since the plain bearings 1D and 1E are made of the self-lubricating resin having the Young's modulus 1600 kgf/mm² or more and having no resin elastic operation, the plain bearings 1D and 1E not deformed even when both end surfaces of the bearings are brought into contact with the circular sliding plates 25 and 27. Accordingly, restriction of the incline of the plain bearings 1D and 1E can be securely performed, and the self-aligning function can be smoothly performed.

Further, it is possible to apply the shape of the bearing described in FIGS. 1 to 6 to the shape of the plain bearings 1D and 1E. That is, the structure may be made such as to form a sliding surface corresponding to a linear parallel surface having a fixed clearance with respect to the pinch roller shaft in a center portion of the inner peripheral surface of the plain bearing and form a taper-like or circular arc-shaped sliding surface which gradually expands in a radial direction from both end portions of the sliding surface toward the end surface of the bearing. Since the operation and effect of the structure mentioned above have been already described in detail, the description will be omitted.

INDUSTRIAL APPLICABILITY

As mentioned above, the pinch roller apparatus in accordance with the present invention is suitable for being used as the pinch roller apparatus for the video tape recorder, the pinch roller apparatus for the audio tape recorder and the like, and the pinch roller apparatus widely used for the tape driving apparatus.

What is claimed is:

1. A pinch roller apparatus comprising:
a pinch roller shaft having one end fixed to an arm;
a plain bearing having a longitudinal center and forming
a hollow cylindrical body extending along a central axis between a radially-extending upper end surface and an opposite radially-extending lower end surface each one of the upper and lower end surfaces formed with an annularly-shaped recess encircling the central axis and tapering inwardly relative to the longitudinal center of the plain bearing as the recess extends radially outwardly relative to the central axis;

a pinch roller main body provided with a rubber elastic body on an outer periphery of a sleeve, said pinch roller main body being mounted to the pinch roller shaft via the plain bearing;

a first circular sliding plate mounted to and extending radially from the pinch roller shaft;

a second circular sliding plate mounted to and extending radially from the pinch roller shaft; and said pinch roller main body being pressed to a capstan by moving said arm, wherein the first circular sliding plate operative to enter the annularly-shaped recess to be brought into contact with the upper end surface and the second circular sliding plate operative to enter the annularly-shaped recess to be brought into contact with the lower end surface of said plain bearing mounted to said pinch roller shaft, wherein when setting a length of an axial gap between the circular sliding plate brought into contact with the upper end surface of the plain bearing and the plain bearing to A and a length of an outer diameter of the circular sliding plate to B, the structure is made such as to satisfy a relation $0.007 \leq A/B \leq 0.006$.

2. A pinch roller apparatus comprising:

a pinch roller shaft having one end fixed to an arm;

a plain bearing having a longitudinal ceter and forming a hollow cylindrical body extending along a central axis between a radially-extending upper end surface and an opposite radially-extending lower end surface, each one of the upper and lower end surfaces formed with an annularly-shaped recess encircling the central axis and tapering inwardly relative to the longitudinal center of the plain bearing as the recess extends racially outwardly relative to the central axis;

a pinch roller main body provided with a rubber elastic body on an outer periphery of a sleeve, said pinch roller main body being mounted to the pinch roller shaft via the plain bearing;

a first circular sliding plate mounted to and extending radially from the pinch roller shaft;

a second circular sliding plate mounted to and extending radially from the pinch roller shaft; and said pinch roller main body being pressed to a capstan by moving said arm, wherein the first circular sliding plate operative to enter the annularly-shaped recess to be brought into contact with the upper end surface and the second circular sliding plate operative to enter the annularly-shaped recess to be brought into contact with the lower end surface of said plain bearing.

3. A pinch roller apparatus as claimed in claim 2, wherein when setting a clearance in a diametrical direction between said pinch roller shaft and said sliding surface of the plain bearing to X and an effective length of the sliding surface of the plain bearing to Y, the structure is made to satisfy the relation $X/Y \geq 0.052$.

4. A pinch roller apparatus as claimed in any one of claims 2 to 3, wherein the circular sliding plate brought into contact with the upper end surface of the plain bearing among said circular sliding plates is integrally formed with an end cap mounted to a front end portion of the pinch roller shaft.

5. A pinch roller apparatus as claimed in any one of claims 2 to 3, wherein the circular sliding plate brought into contact with the upper end surface of the plain bearing among said circular sliding plates is integrally formed with an end cap mounted to a front end portion of the pinch roller shaft.

6. A pinch roller apparatus as claimed in any one of claims 2 to 3, wherein said plain bearing is made of a self-lubricating resin.

7. A pinch roller apparatus as claimed in any one of claims 2 to 3, wherein said plain bearing is structured such that a central portion of an inner peripheral surface is formed in a sliding surface in parallel to an axial direction.

8. A pinch roller apparatus as claimed in any one of claims 2 to 3, wherein said plain bearing forms a sliding surface which is in parallel to an axial direction of the plain bearing at a center portion of the inner peripheral surface and forms a tapering non-sliding surface which gradually expands in a radial direction from both end portions of said sliding surface toward the end portion of the plain bearing.

9. A pinch roller apparatus as claimed in claim 8, wherein a length of said sliding surface is set to 10 to 30% a length in an axial direction of the plain bearing.

10. A pinch roller apparatus as claimed in any one of claims 2 to 3, wherein said plain bearing forms a sliding surface which is in parallel to an axial direction of the plain bearing at a center portion of the inner peripheral surface and forms a circular arc-shaped non-sliding surface which gradually expands in a radial direction from both end portions of said sliding surface toward the end portion of the plain bearing.

11. A pinch roller apparatus as claimed in any one of claims 2 to 3, wherein said plain bearing includes an inner cylinder and an outer cylinder, connected to the inner cylinder by a rib to form a hollow gap between the inner and outer cylinders, the hollow gap open to at least one end surface between said inner cylinder and said outer cylinder, forms a sliding surface which is in parallel to an axial direction of the plain bearing at a center portion of the inner peripheral surface, and forms a tapering non-sliding surface which gradually expands in a radial direction from both end portions of said sliding surface toward the end portion of the plain bearing.

12. A pinch roller apparatus as claimed in claim 11, wherein said hollow gap extends in an axial direction, is open at one end surface of the plain bearing and is closed at another end surface.

13. A pinch roller apparatus as claimed in claim 11, wherein said hollow gap extends in an axial direction, is open at both end surfaces of the plain bearing.

14. A pinch roller apparatus as claimed in any one of claims 11, wherein a length of said sliding surface is set to 10 to 30% a length in an axial direction of the plain bearing.

15. A pinch roller apparatus as claimed in any one of claims 2 to 3, wherein said plain bearing includes an inner cylinder and an outer cylinder, connected to the inner cylinder by rib to form a hollow gap between the inner and outer cylinder and said outer cylinders, the hollow gap open to at least one end surface between said inner cylinder and said outer cylinder, forms a sliding surface which is in parallel to an axial direction of the plain bearing at a center portion of the inner peripheral surface, and forms a circular arc-shaped non-sliding surface which gradually expands in a radial direction from both end portions of said sliding surface toward the end portion of the plain bearing.

* * * * *